US011463326B2

(12) United States Patent
Saini et al.

(10) Patent No.: US 11,463,326 B2
(45) Date of Patent: Oct. 4, 2022

(54) LIGHTWEIGHT RING MANAGER WITH DISTRIBUTED POLICIES

(71) Applicant: Cisco Technology, Inc., San Jose, CA (US)

(72) Inventors: Vinay Saini, Bangalore (IN); Nagendra Kumar Nainar, Morrisville, NC (US); Hazim Hashim Dahir, Wake Forest, NC (US); Carlos M. Pignataro, Raleigh, NC (US); Rajesh Indira Viswambharan, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/183,664

(22) Filed: Feb. 24, 2021

(65) Prior Publication Data

US 2022/0272006 A1    Aug. 25, 2022

(51) Int. Cl.
*H04L 41/00*        (2022.01)
*H04L 12/42*        (2006.01)
(Continued)

(52) U.S. Cl.
CPC .............. *H04L 41/32* (2013.01); *H04L 12/42* (2013.01); *H04L 12/43* (2013.01); *H04L 41/08* (2013.01);
(Continued)

(58) Field of Classification Search
CPC . H04L 41/12; H04L 41/0893; H04L 41/0803; H04L 41/08; H04L 41/044;
(Continued)

(56) References Cited

U.S. PATENT DOCUMENTS 6,717,922 B2 *   4/2004  Hsu ................... H04L 45/18
                                                      370/242
10,122,604 B2   11/2018  Woodford et al.
(Continued)

FOREIGN PATENT DOCUMENTS

WO   WO-2013009260 A1 *  1/2013  ........... H04L 12/437
WO   2018024809          2/2018

OTHER PUBLICATIONS

Song, et al., "Controller-Proxy: Scaling Network Management for Large-Scale SDN Networks", Computer Communications, vol. 108, Aug. 2017, pp. 52-63, Science Direct.
(Continued)

*Primary Examiner* — Glenton B Burgess
*Assistant Examiner* — Rachel J Hackenberg
(74) *Attorney, Agent, or Firm* — Behmke Innovation Group LLC; Kenneth J. Heywood; Jonathon P. Western

(57) ABSTRACT

According to one or more embodiments of the disclosure, a particular networking device located in a ring of networking devices of a network receives an indication from a supervisory service that the particular networking device has been designated a ring manager for the ring of networking devices. The particular networking device determines that the supervisory service is unreachable by the ring of networking devices. The particular networking device obtains telemetry data regarding a new device connected to the ring of networking devices. The particular networking device onboards, based on the telemetry data, the new device to the network, when the supervisory service is unreachable by the ring of networking devices.

20 Claims, 6 Drawing Sheets

(51) Int. Cl.
*H04L 12/43* (2006.01)
*H04L 41/08* (2022.01)
*H04L 43/08* (2022.01)

(52) U.S. Cl.
CPC ........ *H04L 43/08* (2013.01); *H04L 2012/421* (2013.01)

(58) Field of Classification Search
CPC ..... H04L 41/20; H04L 41/0806; H04L 43/08; H04L 43/0811; H04L 43/0805; H04L 43/0817; H04L 63/10; H04L 63/0272; H04L 12/437; H04L 12/4641; H04L 47/20; H04L 47/746; H04L 47/74; H04L 47/745; H04L 12/427; H04L 12/43; H04L 12/433; H04L 12/42; H04L 12/422; H04L 2012/421
See application file for complete search history.

(56) References Cited

U.S. PATENT DOCUMENTS

| | | | |
|---|---|---|---|
| 10,367,676 B1* | 7/2019 | Vermeulen .......... | H04L 41/0213 |
| 10,412,012 B2 | 9/2019 | Bhattacharya et al. | |
| 10,678,233 B2 | 6/2020 | Cella et al. | |
| 2007/0268913 A1* | 11/2007 | Denecheau ......... | H04L 12/4641 |
| | | | 370/397 |
| 2010/0246385 A1* | 9/2010 | Balasumbramanian ..................... | |
| | | | H04L 69/18 |
| | | | 370/222 |
| 2011/0058560 A1* | 3/2011 | Okita ................. | H04L 12/4637 |
| | | | 370/395.53 |
| 2016/0323153 A1* | 11/2016 | Cordray ............. | H04L 67/1002 |
| 2016/0373272 A1* | 12/2016 | Xu ..................... | H04L 41/0659 |
| 2017/0085488 A1* | 3/2017 | Bhattacharya ...... | H04L 41/0806 |
| 2018/0270105 A1* | 9/2018 | Pan .................... | H04L 43/0811 |
| 2019/0280926 A1 | 9/2019 | Miklós et al. | |
| 2020/0244516 A1* | 7/2020 | Murray .............. | H04L 43/0811 |
| 2020/0310394 A1* | 10/2020 | Wouhaybi ............ | H04L 67/125 |
| 2020/0322230 A1 | 10/2020 | Natal et al. | |
| 2021/0029029 A1* | 1/2021 | Mehmedagic ......... | H04L 63/08 |

OTHER PUBLICATIONS

Kim, et al., "Proxy SDN Controller for Wireless Networks", Mobile Information Systems, Aug. 2016, 14 pages, Hindawi Publishing Corporation.

Murrell, Will, "How Many Software-Defined Networking Controllers are Needed?", Apr. 2016, 4 pages, TechTarget.com.

"What Could Happen in a Software-Defined Network if the Main Centralized Controller Broke?", online: https://www.quora.com/What-could-happen-in-a-software-defined-network-if-the-main-centralized-controller-broke, Oct. 2014, 4 pages, Quora, Inc.

"Operational Technology", online: https://en.wikipedia.org/wiki/Operational_technology, Jan. 2021, 4 pages, Wikimedia Foundation, Inc.

"Cisco Resilient Ethernet Protocol", White Paper, Sep. 2007, 9 pages, Cisco Systems, Inc.

"Provision Your Network", Jan. 2021, 98 pages, Cisco.com.

* cited by examiner

LIGHTWEIGHT RING MANAGER WITH DISTRIBUTED POLICIES

TECHNICAL FIELD

The present disclosure relates generally to computer networks, and, more particularly, to a lightweight ring manager with distributed policies.

BACKGROUND

Operational Technology (OT) networks are typically used to automate processes, such as factories, buildings, etc. Increasingly, OT networks are making use of networking devices that form a ring topology. Indeed, it is now common to see many rings of OT networks connecting various other rings or endpoint such as sensors, input/output (I/O) devices, and the like, through the ring topology and back to the enterprise.

Network management is also increasingly shifting towards centralized control and oversight for purposes of onboarding devices, deploying network policies, and the like. However, the very nature of many OT networks has hampered the adoption of this approach. Indeed, connectivity to a remote network manager is not guaranteed in certain types of network deployments. For instance, in the case of a mine, a moving vehicle cutting a copper wire could result in a total loss of connectivity to a remote network manager.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
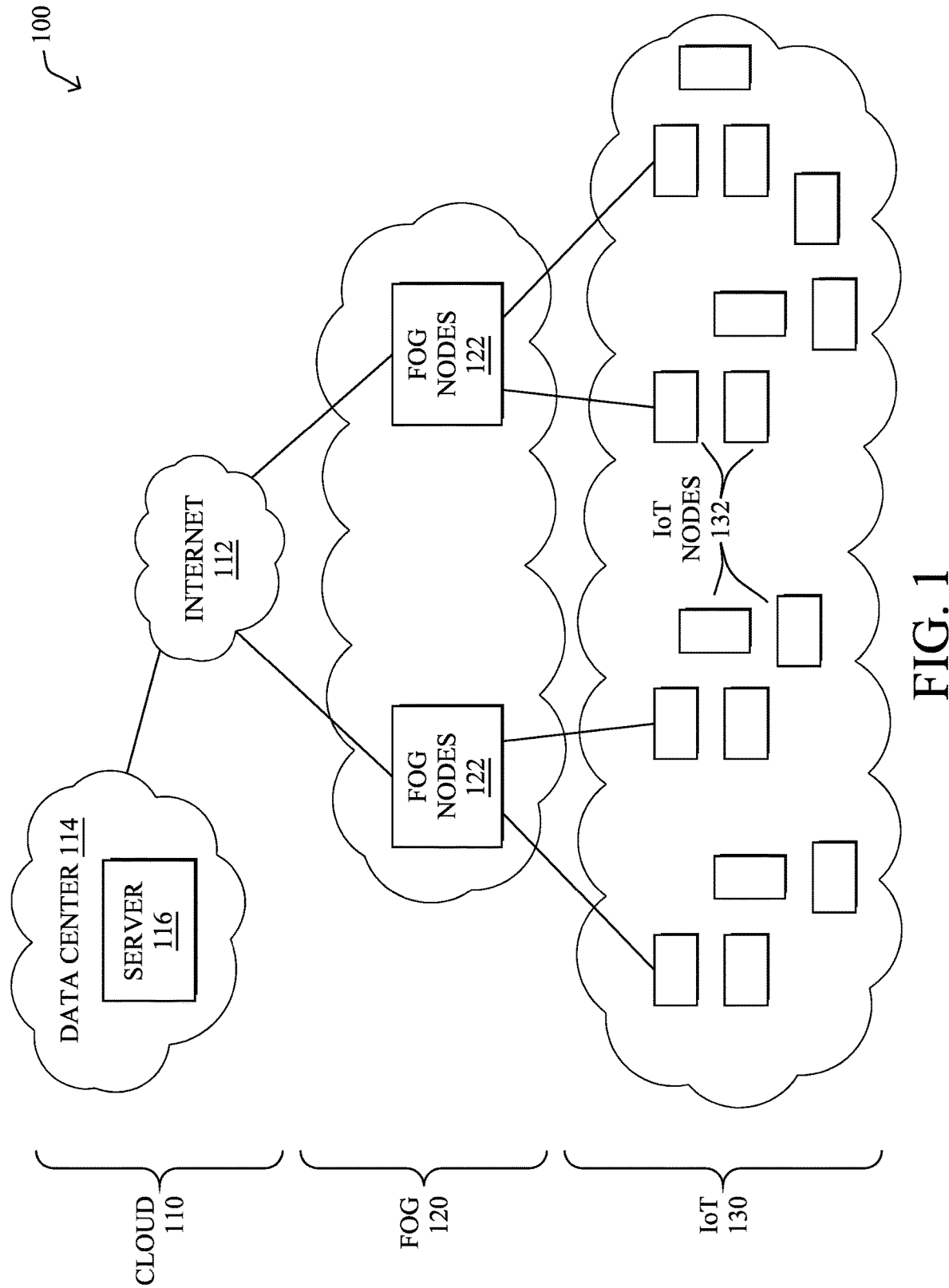
FIG. 1 illustrates an example network.

According to one or more embodiments of the disclosure, a particular networking device located in a ring of networking devices of a network receives an indication from a supervisory service that the particular networking device has been designated a ring manager for the ring of networking devices. The particular networking device determines that the supervisory service is unreachable by the ring of networking devices. The particular networking device obtains telemetry data regarding a new device connected to the ring of networking devices. The particular networking device onboards, based on the telemetry data, the new device to the network, when the supervisory service is unreachable by the ring of networking devices.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may is be the public Internet or a private network.

Often, IoT networks operate within a shared-media mesh networks, such as wireless or Powerline Communication networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to is uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, powerline communication links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely cloud layer 110, fog layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT device layer 130. For example, fog nodes/devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, powerline communication protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), powerline communication protocols, or other shared-media protocols where appropriate. In this context, a protocol consists of a set of rules defining how the nodes interact with each other.

Figure 2:
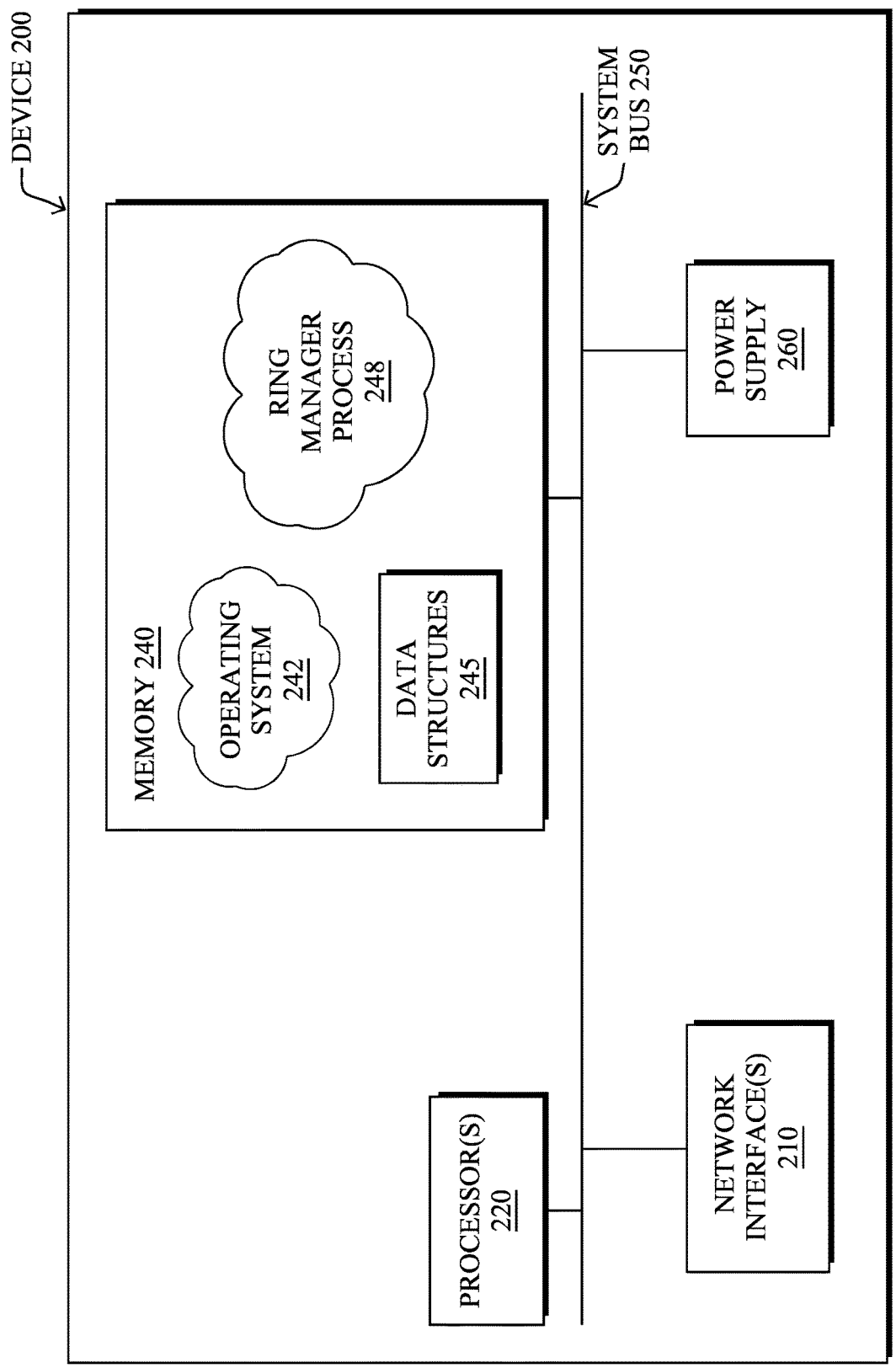
FIG. 2 illustrates an example network device/node.

FIG. 2 is a schematic block diagram of an example node/device 200 that may be used with one or more embodiments described herein. As shown, device 200 may comprise one or more communication interfaces 210 (e.g., wired, wireless, etc.), at least one processor 220, and a memory 240 interconnected by a system bus 250, as well as a power supply 260 (e.g., battery, plug-in, etc.). In various embodiments, node/device 200 may take the form of a networking device, such as an access point (AP), AP controller, switch, router, or the like.

Communication interface(s) 210 include the mechanical, electrical, and signaling circuitry for communicating data over a communication link. To this end, communication interface(s) 210 may be configured to transmit and/or receive data using a variety of different communication protocols, such as TCP/IP, UDP, etc. Note that the device 200 may have multiple different types of communication interface(s) 210, e.g., wireless and wired/physical connections, and that the view herein is merely for illustration.

The memory 240 comprises a plurality of storage locations that are addressable by the processor(s) 220 and the communication interface(s) 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a ring manager process 248, as detailed below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Figure 3:
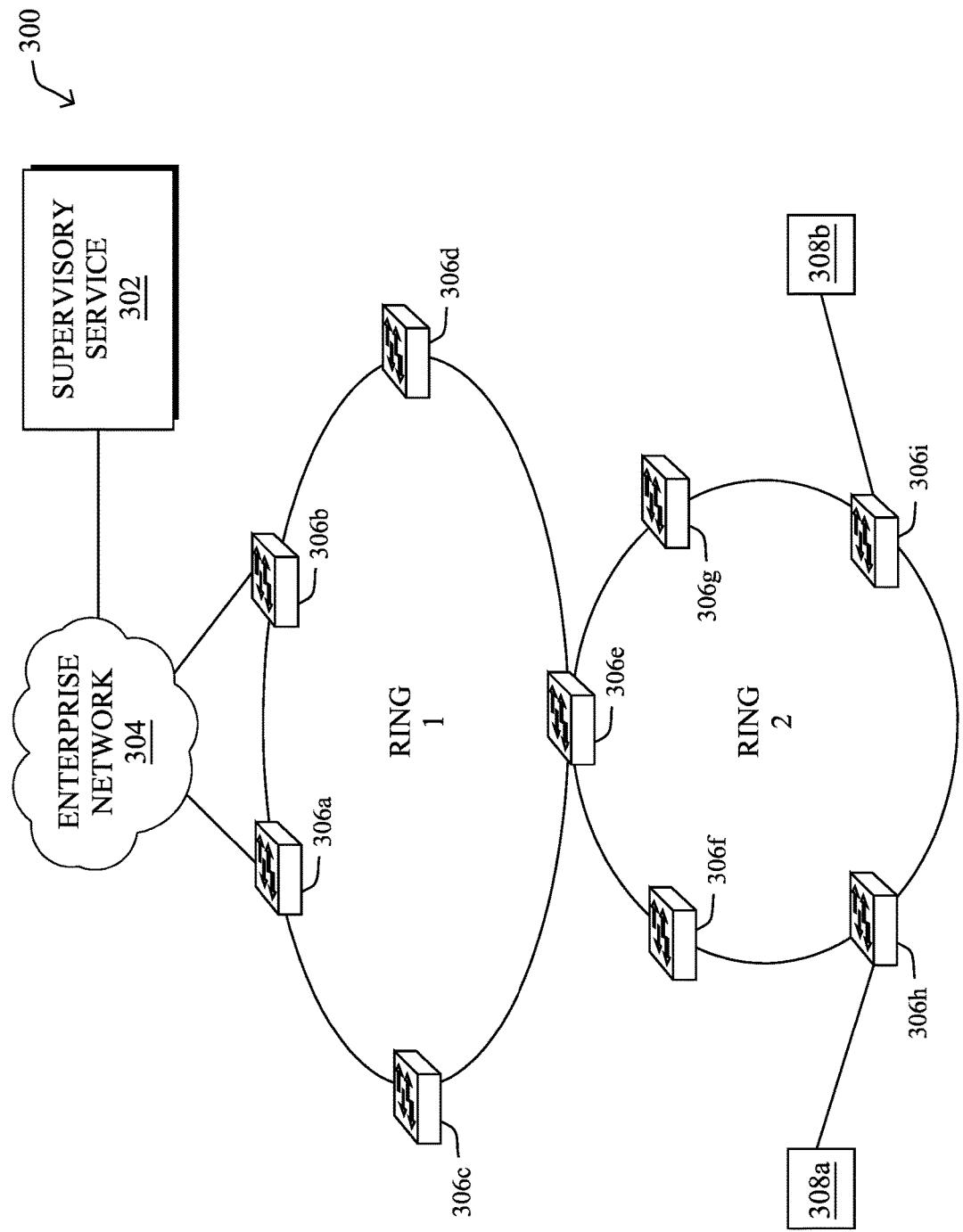
FIG. 3 illustrates an example network comprising network rings.

As noted above, it is common in many Operational Technology (OT) networks to include networking devices (e.g., switches, routers, etc.) arranged in a ring topology, to connect to other rings and/or endpoints such as sensors, input/output (I/O) devices, and is the like, thereby providing connectivity back to the enterprise. FIG. 3 illustrates an example network 300 that includes such rings, in one embodiment.

More specifically, as shown in FIG. 3, network 300 may comprise any number of networking devices 306, such as networking devices 306a-306i (e.g., Ethernet switches, etc.), which provide connectivity between endpoints 308, such as 308a-308b, and an enterprise network 304. For instance, endpoints 308a-308b may take the form of sensors, actuators, moving nodes (e.g., vehicles, mine carts, etc.), human-machine-interfaces, controllers, or the like.

In various embodiments, networking devices 306a-306i may form one or more rings (i.e., ring topologies). For instance, networking devices 306a-306e may form a first ring, while networking devices 306e-306i may form a second ring that is a sub-ring of the first ring. Typically, each ring may make use of a ring-control protocol such as the Spanning Tree Protocol (STP), Resilient Ethernet Protocol (REP), or the like. Networking devices 306a-306i may use REP, for instance, to handle link failures and ensure quick network convergence, through the control over their ports. More specifically, under REP, at least one port of a networking device may be designated as an alternate port and placed into a blocked state for each Virtual LAN (VLAN). When a link failure is detected, the alternate port can be activated, thereby ensuring connectivity. REP also provides for very fast convergence recovery times and is able to support convergence times of up to approximately 50 ms.

In various embodiments, network 300 may also include a supervisory service 302 that provides supervisory control over the networking devices in network 300, such as 306a-306i. An example of such a supervisory service is Cisco Digital Network Architecture (Cisco DNA) by Cisco Systems, Inc. Such supervisory function may include, for example, any or all of the following, among others:

Device Onboarding—here, supervisory service 302 may be responsible for overseeing the onboarding of any new devices to the network, such as assigning them to security groups, cataloging the new device, etc.

Implementing Security Policies—supervisory service 302 may also be responsible for specifying security policies for network 300, such as by preventing a certain endpoint from communicating with another endpoint, etc.

Network Monitoring—supervisory service 302 may also receive telemetry data collected from network 300, allowing supervisory service 302 to assess and report on the health of network 300.

Device Configuration—supervisory service 302 may also configure the networking devices in network 300, such as by pushing software updates to networking devices 306a-306i, In other words, supervisory service 302 may supervise any or all of the various functions of network 300. However, the more supervisory control over the functions of network 300, the more interrupted connectivity to supervisory service 302 becomes imperative. This cannot be guaranteed, though, in many types of OT networks. For instance, networks deployed to underground mines often experience connectivity issues due to cut wires that result from mining operations (e.g., a vehicle accidentally cuts a copper cable, etc.). When this occurs, a network ring in the tunnel or mine may become completely isolated.

Lightweight Ring Manager with Distributed Policies

The techniques herein introduce an intelligent mechanism whereby a lightweight ring manager may be deployed to one or more networking devices in a ring topology. In some aspects, the ring manager may take over the functions of a remote supervisory service, when connectivity drops to the supervisory service. By bringing intent-based networking operations closer to the industrial network, network operations can continue, even when there is no external network connectivity.

Illustratively, the techniques described herein may be performed by hardware, software, and/or firmware, such as in accordance with ring manager process 248, which may include computer executable instructions executed by the processor 220 (or independent processor of interfaces 210) to perform functions relating to the techniques is described herein.

Specifically, according to various embodiments, a particular networking device located in a ring of networking devices of a network receives an indication from a supervisory service that the particular networking device has been designated a ring manager for the ring of networking devices. The particular networking device determines that the supervisory service is unreachable by the ring of networking devices. The particular networking device obtains telemetry data regarding a new device connected to the ring of networking devices. The particular networking device onboards, based on the telemetry data, the new device to the network, when the supervisory service is unreachable by the ring of networking devices.

Operationally, the techniques herein introduce the concept of a ring manager that comprises an application or other piece of software that can be hosted and executed by a networking device. Indeed, many network switches now include the ability to host applications that can be executed in a container, virtual machine (VM), or the like.

Figure 4:
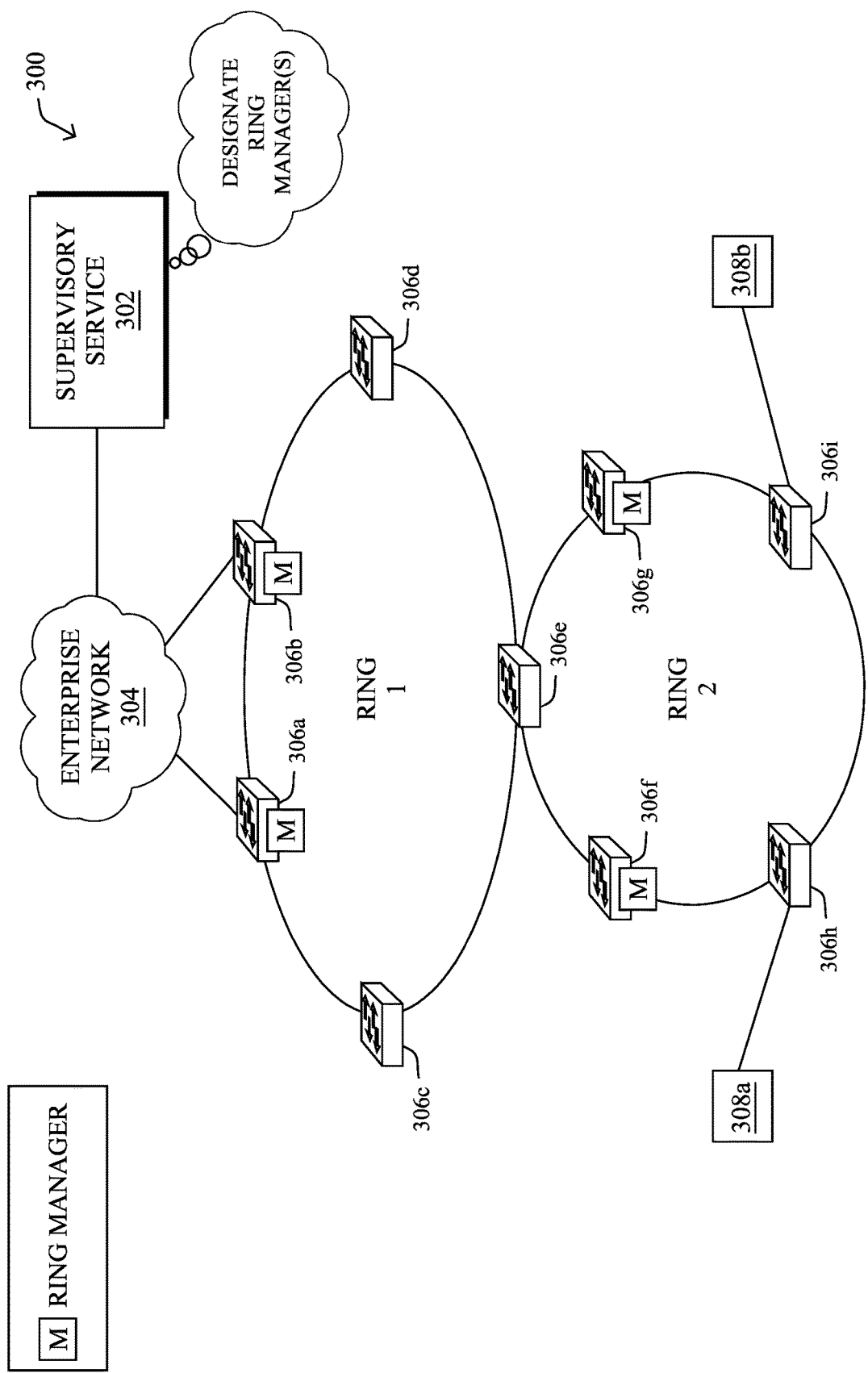
FIG. 4 illustrates an example of the designation of ring managers.

FIG. 4 illustrates an example of the designation of networking devices as ring managers, according to various embodiments. Continuing the example of FIG. 3, consider again network 300 whose operations are overseen by supervisory service 302. In various embodiments, another function of supervisory service 302 may be to designate one or more networking devices with a ring as a ring manager for that ring. In turn, supervisory service 302 may provide an indication of this designation to the selected networking device(s). If not already installed, supervisory service 302 may also install a ring manager application to the designated networking devices as part of the designation process.

For instance, assume that supervisory service 302 has designated networking devices 306a-306b in the first network ring as ring managers and networking devices 306f-306g as ring managers for the second ring in network 300. These networking devices are marked 'M' in FIG. 4 to represent these designations. In cases in which more than one networking device 306 has been designated as a ring manager by supervisory is service 302, supervisory service 302 may also appoint a specific one of them to act as the acing ring manager, to avoid policy overwrites and other discrepancies. In other words, supervisory service 302 may install the ring manager application to any or all of the networking devices 306 in a given ring, to provide a failsafe in case the acting ring manager loses connectivity.

In some embodiments, supervisory service 302 may base its designation of a particular networking device 306 as a ring manager on any or all of the following criteria, among others:
Availability
Role
Health Status (e.g., resource usage, etc.)
Type
Software Version
Etc.

While functioning as a ring manager, a networking device 306 may take on any or all of the functions that would normally be performed by supervisory service 302 for its ring, in some embodiments. To this end, as part of the designation, supervisory service supervisory service 302 may specify one or more network policies to that networking device 306. For instance, an agent in supervisory service 302 may continuously customize the policy (to be enforced by the ring manager) for the specific type(s) of traffic expected in the ring, the quality of service (QoS) required for that traffic, security policies that should be enforced, etc. In turn, supervisory service 302 may push the policy to the designated ring manager(s) in a given ring. Typically, the policy will be ring-specific and there may be different policies for each ring. Supervisory service 302 may, for instance, may use statically defined policies on a per-ring basis or, alternatively, employ pattern learning, to generate a policy for a particular ring.

Figure 5:
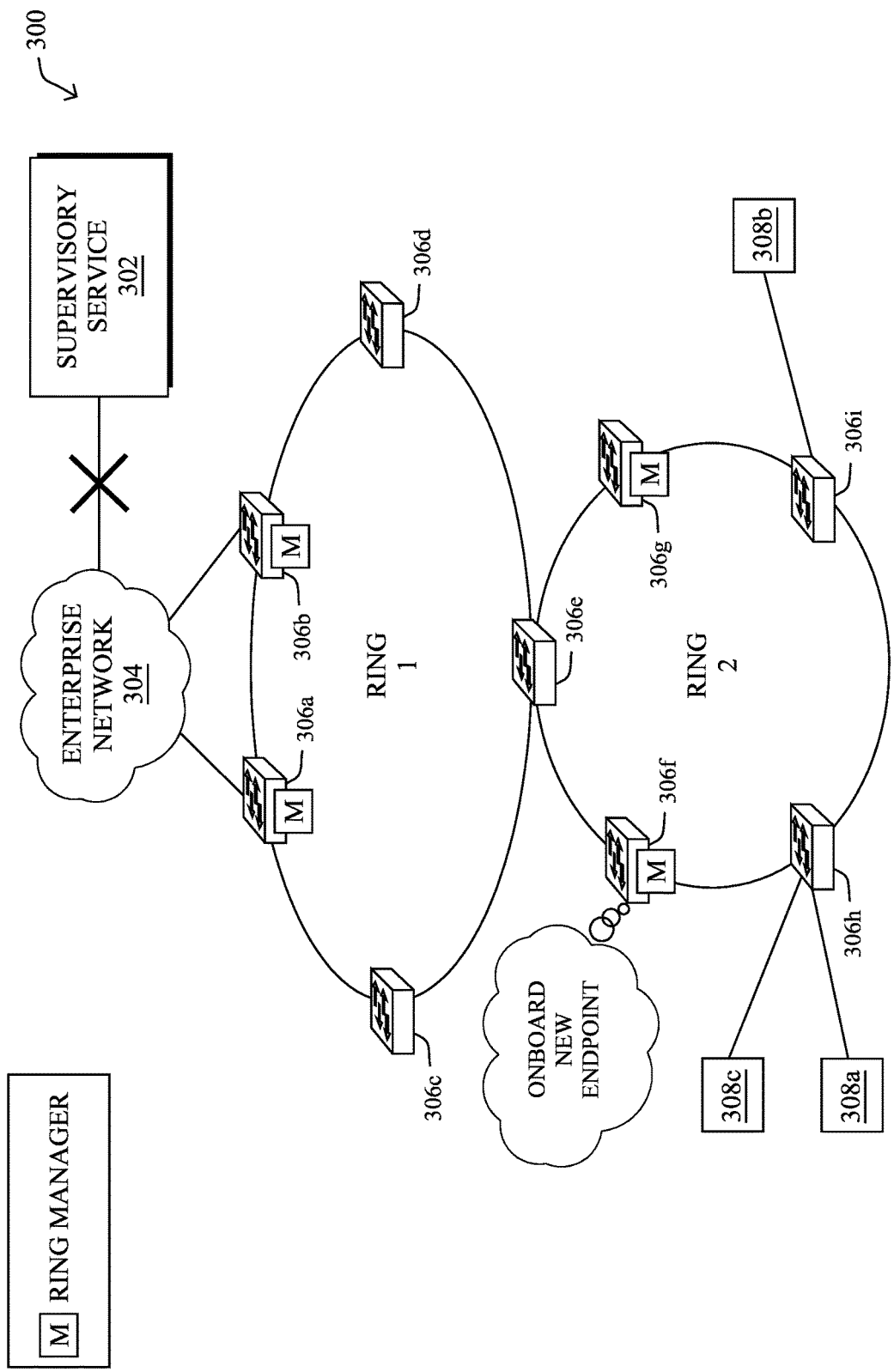
FIG. 5 illustrates an example of a ring manager managing a ring when a supervisory service is unavailable.

According to various embodiments, a designated ring manager in network 300 may only take over the management functions of supervisory service 302 in cases in which supervisory service 302 cannot be reached by its ring. For instance, as shown in FIG. 5, assume now that connectivity to supervisory service 302 has been lost, for whatever reason, and is unreachable by networking devices 306a-306i. To detect this loss of connectivity, each ring manager may constantly monitor the connectivity back to supervisory service 302 and, if it determines that supervisory service 302 is unreachable and the ring manager is the acting ring manager for the ring, assume supervisory control over the ring. For instance, a networking device 306a-306i may detect a loss of connectivity with supervisory service 302 via Internet Control Message Protocol (ICMP) signaling, Bidirectional Forwarding Detection (BFD) signaling, Seamless BFD (SBFD) signaling, IP Service Assurance Agreement (IPSLA) signaling, or via another suitable mechanism.

In response to connectivity to supervisory service 302 being lost by the ring, the member networking devices of the ring may rely on their designated acting ring manager for supervisory functions, while the connectivity to supervisory service 302 is down. To this end, the acting ring manager may receive telemetry data from the other networking devices in the ring (and/or collected by itself) and use this telemetry data to mate control decisions for the ring. Such functions may entail, for instance, onboarding new devices to network 300, controlling traffic in the ring (e.g., by assigning traffic to a certain path, etc.), managing the IP address pool, assigning devices to security groups and enforcing security policies, collecting and verifying authorization details, and the like.

By way of example, assume that connectivity to supervisory service 302 has been lost and, during this time, a new endpoint 308c joins the network and connects to the second ring comprising networking devices 306e-306i, In such a case, networking device 306f, which has been designated the acting ring manager, may handle the onboarding of to endpoint 308c, according to the policy previously passed to networking device 306f by supervisory service 302. To this end, in various embodiments, networking device 306f may authenticate endpoint 308c, assign an address to endpoint 308c, assign a security group to endpoint 308c, assign a QOS to the traffic of endpoint 308c, assign a path to the traffic of endpoint 308c, etc., based on the telemetry data collected regarding endpoint 308c.

In further embodiments, networking device 306f may base the above management operations on the intent of endpoint 308c, which can be inferred from the device type of endpoint 308c. Indeed, different device types may have different, requirements in terms of security, traffic QoS, etc. Accordingly, the policy pushed by supervisory service 302 to networking device 306f may also specify the different device types that could be expected to connect to the ring of networking devices 306e-306i, thereby allowing networking device 306f to implement intent-based networking locally within the ring.

If connectivity to the acting ring manager for the ring is also lost, another networking device 306 in that ring may similarly take over the management operations for the ring. For instance, if networking device 306f is the acting ring manager and connectivity to it is lost, networking device 306g, which is also capable of acting as a ring manager, may take over for networking device 306f, if networking device 306f becomes unreachable or otherwise stops functioning.

Once connectivity is restored to supervisory service 302, supervisory service 302 may again take over the management functions with respect to the ring of networking devices 306. This can be detected by networking devices 306 in a similar manner as determining that the connectivity was lost, originally. In turn, the acting ring manager may report any actions that it undertook during the down period to supervisory service 302. In further cases, the acting ring manager may also report any telemetry data collected in the ring during the period of disconnection. Doing so may allow supervisory service 302 to fill in any gaps in any records and/or time series maintained by supervisory, service 302 regarding network 300.

Figure 6:
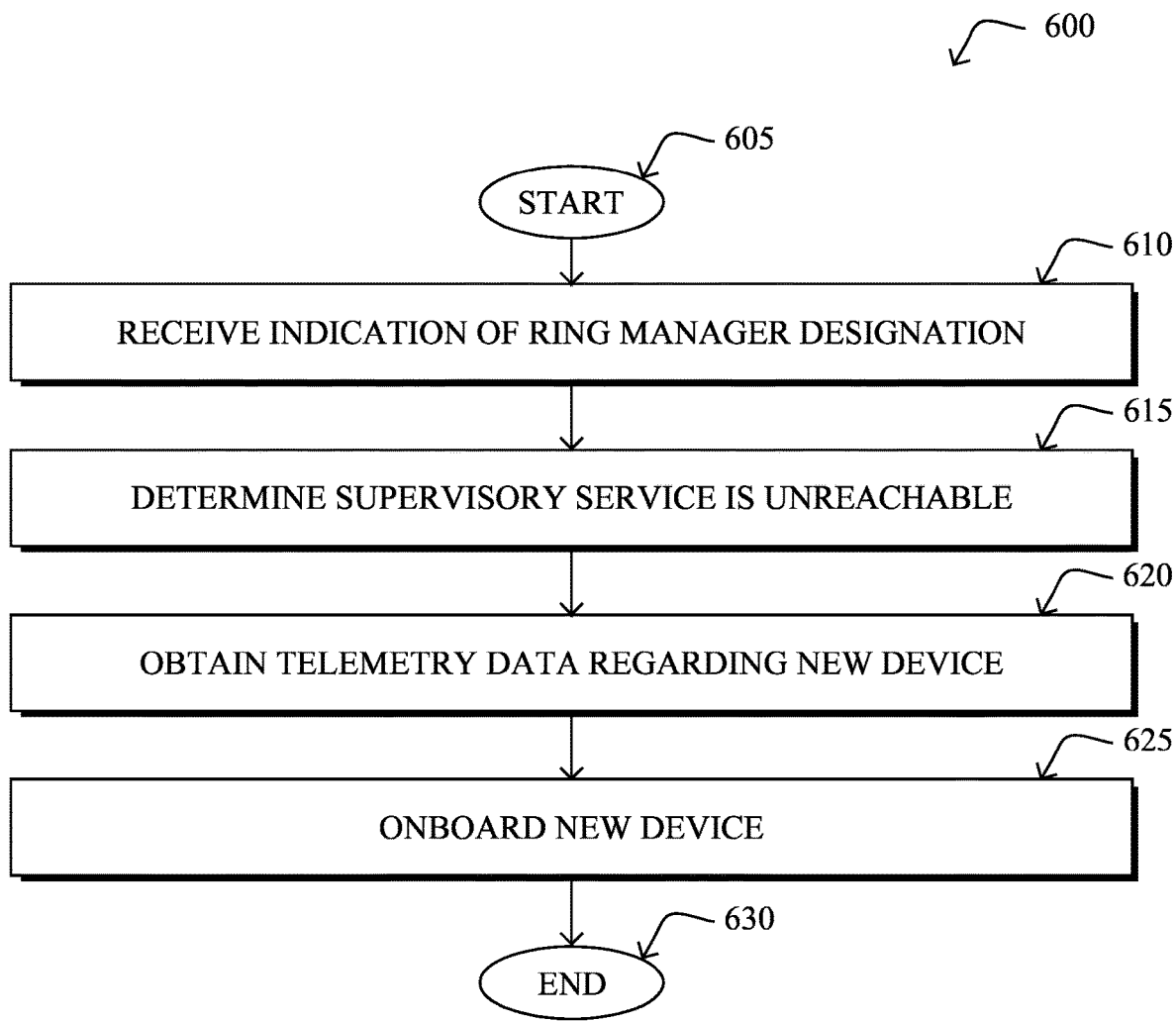
FIG. 6 illustrates an example simplified procedure for managing a ring of networking devices.

FIG. 6 illustrates an example simplified procedure for managing a ring of networking devices, in accordance with one or more embodiments described herein. In various embodiments, a non-generic, specifically configured networking device (e.g., device 200) may perform procedure 600 by executing stored instructions (e.g., process 248). For instance, a particular networking device located in a ring of networking devices, such as a switch, etc., may perform procedure 600. The procedure 600 may start at step 605, and continues to step 610, where, as described in greater detail above, the particular networking device may receive an indication from a supervisory service that the particular networking device has been designated a ring manager for the ring of networking devices.

At step 615, as detailed above, the particular networking device may determine that the supervisory service is unreachable by the ring of networking devices. In some instances, the particular networking device itself may make this determination, such as by leveraging signaling in a suitable protocol to the supervisory service. In other instances, the particular networking device may receive an indication that the connection is down from another device, such as another networking device in the ring.

At step 620, the particular networking device may obtain telemetry data regarding a new device connected to the ring of networking devices, as described in greater detail above. In general, the telemetry data may take the form of any information that may be captured by the network regarding the new device, such as data indicative of its device type, authentication credentials, the protocols used by the new device, etc. For instance, the telemetry data may be collected passively (e.g., by observing traffic sent by the new device) and/or actively (e.g., by probing the new device).

At step 625, as detailed above, the particular networking device in the ring may onboard the new device to the network, when the supervisory service is unreachable by the ring of networking device. For instance, the particular networking device may execute a ring manager application received from the supervisory service that causes the particular networking device to perform the management functions typically performed by the supervisory service. More specifically, during the onboarding, the particular networking device may assign a network path to the new device, assign security credentials to the new device for the network, or the like. Procedure 600 then ends at step 630.

It should be noted that while certain steps within procedure 600 may be optional as described above, the steps shown in FIG. 6 are merely examples for illustration, and is certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow a supervisory service to dynamically identify the optimal set of nodes within each ring/sub-ring to function as ring managers and instantiate a ring manager application on them. In further aspects, the techniques herein may allow for ring-specific policies to be applied, such as based on the types of devices expected for onboarding. In a further aspect, a ring manager may only be activated when the supervisory service is down or otherwise unavailable. In an additional aspect, telemetry data can also be collected within the ring while the supervisory service is unreachable, and reported to it when again available, thereby allowing the service to fill in any data gaps in its timeseries or other reports.

While there have been shown and described illustrative embodiments for a ring manager to take over management functions when a supervisory service is unavailable/unreachable, it is to be understood that various other adaptations and modifications may be made within the intent and scope of the embodiments herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments is herein.

What is claimed is:

1. A method comprising:
   receiving, at a particular networking device located in a ring of networking devices of a network, an indication from a supervisory service that is remote of the ring of networking devices and provides supervisory control of the network, the indication from the supervisory service indicating that the particular networking device has been designated a ring manager for the ring of networking devices;
   determining, by the particular networking device, that the supervisory service is unreachable by the ring of networking devices;
   obtaining, by the particular networking device, telemetry data regarding a new device connected to the ring of networking devices; and
   onboarding, by the particular networking device and based on the telemetry data, the new device to the network, when the supervisory service is unreachable by the ring of networking devices.

2. The method as in claim 1, wherein the networking devices are Ethernet switches.

3. The method as in claim 1, further comprising:
   providing, by the particular networking device and to the supervisory service, information regarding the new device onboarded to the network by the particular networking device, when the supervisory service is again reachable by the ring of networking devices.

4. The method as in claim 1, wherein receiving the indication from the supervisory service comprises:
   receiving a ring manager application for execution by the particular networking device from the supervisory service, wherein the particular networking device uses the ring manager application to onboard the new device.

5. The method as in claim 4, wherein the particular networking device executes the ring manager application in a virtual machine (VM) or container.

6. The method as in claim 4, wherein the supervisory service deploys the ring manager application to a subset of the networking devices in the ring and selects the particular networking device as the ring manager from among the subset.

7. The method as in claim 1, wherein receiving the indication from the supervisory service comprises:

receiving, from the supervisory service, a network policy specific to the ring of networking devices, wherein the new device is onboarded according to the network policy.

8. The method as in claim 7, wherein the telemetry data indicates a device type associated with the new device, and wherein the new device is onboarded according to the network policy based in part on its device type.

9. The method as in claim 1, wherein onboarding the new device comprises:
assigning security credentials to the new device for the network.

10. The method as in claim 1, wherein onboarding the new device comprises:
assigning a network path to the new device.

11. An apparatus, comprising:
one or more interfaces to communicate with a ring of networking devices of a network;
a processor coupled to the one or more interfaces and configured to execute one or more processes; and
a memory configured to store a process that is executable by the processor, the process when executed configured to:
receive an indication from a supervisory service that is remote of the ring of networking devices and provides supervisory control of the network, the indication from the supervisory service indicating that the apparatus has been designated a ring manager for the ring of networking devices;
determine the supervisory service is unreachable by the ring of networking devices;
obtain telemetry data regarding a new device connected to the ring of networking devices; and
onboard, based on the telemetry data, the new device to the network, when the supervisory service is unreachable by the ring of networking devices.

12. The apparatus as in claim 11, wherein the networking devices are Ethernet switches.

13. The apparatus as in claim 11, wherein the process when executed is further configured to:
provide, to the supervisory service, information regarding the new device onboarded to the network by the apparatus, when the supervisory service is again reachable by the ring of networking devices.

14. The apparatus as in claim 11, wherein the apparatus receives the indication from the supervisory service by:
receiving a ring manager application for execution from the supervisory service, wherein the apparatus uses the ring manager application to onboard the new device.

15. The apparatus as in claim 14, wherein the apparatus executes the ring manager application in a virtual machine (VM) or container.

16. The apparatus as in claim 14, wherein the supervisory service deploys the ring manager application to a subset of the networking devices in the ring and selects the apparatus as the ring manager from among the subset.

17. The apparatus as in claim 11, wherein the apparatus receives the indication from the supervisory service by:
receiving, from the supervisory service, a network policy specific to the ring of networking devices, wherein the new device is onboarded according to the network policy.

18. The apparatus as in claim 17, wherein the telemetry data indicates a device type associated with the new device, and wherein the new device is onboarded according to the network policy based in part on its device type.

19. The apparatus as in claim 11, wherein the apparatus comprises a network switch.

20. A tangible, non-transitory, computer-readable medium storing program instructions that cause a particular networking device located in a ring of networking devices of a network to execute a process comprising:
receiving, at the particular networking device, an indication from a supervisory service that is remote of the ring of networking devices and provides supervisory control of the network, the indication from the supervisory service indicating that the particular networking device has been designated a ring manager for the ring of networking devices;
determining, by the particular networking device, that the supervisory service is unreachable by the ring of networking devices;
obtaining, by the particular networking device, telemetry data regarding a new device connected to the ring of networking devices; and
onboarding, by the particular networking device and based on the telemetry data, the new device to the network, when the supervisory service is unreachable by the ring of networking devices.

* * * * *

UNITED STATES PATENT AND TRADEMARK OFFICE
CERTIFICATE OF CORRECTION

PATENT NO. : 11,463,326 B2
APPLICATION NO. : 17/183664
DATED : October 4, 2022
INVENTOR(S) : Vinay Saini et al.

It is certified that error appears in the above-identified patent and that said Letters Patent is hereby corrected as shown below:

In the Specification

Column 2, Line 30, please amend as shown:
e.g., via IP), which may be the public Internet or a private Column 3, Line 43, please amend as shown:
"IoT" may be used by those in the art to refer to uniquely Column 5, Line 34, please amend as shown:
input/output (I/O) devices, and the like, thereby providing Column 6, Line 49, please amend as shown:
to perform functions relating to the techniques described Column 7, Line 22, please amend as shown:
manager by supervisory service 302, supervisory service Column 8, Line 15, please amend as shown:
telemetry data to make control decisions for the ring. Such Column 8, Line 25, please amend as shown:
ring comprising networking devices 306e-306i. In such a Column 8, Line 27, please amend as shown:
acting ring manager, may handle the onboarding of Column 8, Line 40, please amend as shown:
different requirements in terms of security, traffic QoS, etc.

Signed and Sealed this
Third Day of January, 2023

Katherine Kelly Vidal
*Director of the United States Patent and Trademark Office*

CERTIFICATE OF CORRECTION (continued)
U.S. Pat. No. 11,463,326 B2

Column 8, Line 66, please amend as shown:
and / or time series maintained by supervisory service 302

Column 9, Line 49, please amend as shown:
shown in FIG. 6 are merely examples for illustration, and Column 10, Line 22, please amend as shown:
embodiments herein.